United States Patent [19]

Sears

[11] 4,255,866
[45] Mar. 17, 1981

[54] NONMAGNETIC COMPASS

[75] Inventor: James T. Sears, Panama City, Fla.

[73] Assignee: The United States of America as represented by the Secretary of the Navy, Washington, D.C.

[21] Appl. No.: 89,660

[22] Filed: Oct. 30, 1979

[51] Int. Cl.³ .................................................. G01C 17/30
[52] U.S. Cl. ........................................ 33/361; 33/349; 33/356; 33/363 R; 324/247
[58] Field of Search .................... 33/361, 362, 363 R, 33/349, 363 Q, 363 K, 363 L, 363 N, 348, 356; 340/27 NA; 324/244, 247, 260

[56] References Cited

U.S. PATENT DOCUMENTS

| 3,197,880 | 8/1965 | Rice et al. ................................ 33/361 |
| 3,237,584 | 3/1966 | Keithley, Jr. ........................ 33/349 X |
| 3,280,781 | 10/1966 | Koerner ................................... 33/361 |
| 3,425,648 | 2/1969 | Wipff et al. ......................... 33/361 X |
| 3,802,088 | 4/1974 | Barrett et al. ........................... 33/361 |
| 3,903,610 | 9/1975 | Heaviside et al. ...................... 33/361 |
| 3,905,121 | 9/1975 | Takeda et al. .......................... 33/361 |
| 3,939,572 | 2/1976 | Erspamer ................................ 33/361 |
| 3,952,420 | 4/1976 | Benjamin et al. ....................... 33/361 |
| 4,037,328 | 7/1977 | Kuehn et al. ............................ 33/361 |

Primary Examiner—William D. Martin, Jr.
Attorney, Agent, or Firm—Richard S. Sciascia; Harvey A. David

[57] ABSTRACT

A compass device for underwater use and having substantially no magnetic signature or influence utilizes three Hall effect generators in an array wherein two of the generators have their principal axes of magnetic response extending normal to one another and at 45° to the axis of the third generator. The array is rotatable relative to a base carrying three lights and solid state analog logic circuitry for causing the lights to be variously lighted and extinguished to indicate a need to turn left, to turn right, or being on course.

11 Claims, 3 Drawing Figures

NONMAGNETIC COMPASS

BACKGROUND OF THE INVENTION

This invention relates generally to the field of direction indicating compasses, and more particularly to an improved compass device for underwater guidance of divers and which is characterized by a particularly low or substantially insignificant magnetic signature.

Location and disposal of underwater explosive ordinance, such as magnetic influence mines, are at times accomplished by divers equipped with specially designed non-magnetic breathing apparatus. The search and location phases of such an operation have been hampered in the past by the lack of a suitable non-magnetic compass or guidance means that a diver could safely carry to provide directional reference in carrying out a search pattern or in following a vectored course. In this regard, it has been found desirable to provide the diver with a compass device that provides a course or steering correction indication rather than a numerical or dial readout of actual heading.

Existing compasses or guidance devices for divers have utilized magnetized needles or magnet carrying compass cards or have utilized electrically operated magnetic flux gate devices having ferrite cores, magnetic flux concentrator, or the like, all of which exhibit a magnetic signature that far exceeds the level of five gamma at 4.5 inches that is considered the limit for safe use in the vicinity of magnetically sensitive explosive ordnance devices.

The development in recent years of what are known as Hall effect solid state electronic devices has provided the compass or guidance device art with an additional means for sensing direction through the earth's magnetic field. Examples thereof are found in U.S. Pat. No. 3,952,420 to R. P. Benjamin et al. and in U.S. Pat. No. 4,030,204 to R. A. Edwards. The former discloses the use of Hall effect devices in combination with oscillator clocked binary logic to generate a direct digital readout that presents the heading in degrees in numerical form. The second patent discloses an automobile compass utilizing two Hall generators in mutually perpendicular planes in combination, in one embodiment, with digital logic to generate an eight segment light emitting diode display indicating heading in cardinal and semi-cardinal points. In another embodiment linear amplifier means are used to drive a phase meter type of moving needle display to indicate heading. Neither of these types of indicating displays have been found to be well suited for use by a swimmer/diver in guiding his movements in that they require more attention and concentration on the display than the diver can reasonably devote. The second patent further contemplates the use of magnetic deviation compensation means incorporating movable bar magnets. The use of either compensating magnets or indicators having magnetic frames or cores produces a significant magnetic signature that the compasses, while useful for their intended purposes, do not answer the needs of diver's likely to approach magnetic influence explosive ordnance devices.

SUMMARY OF THE INVENTION

With the forgoing in mind, it is a principal object of this invention to provide a directional compass that is substantially non-magnetic. That is to say, one having a minimal magnetic signature or influence on the earth's magnetic field so as to be safe to use in close proximity to magnetic influence ordnance such as explosive mines or the like.

Another object of the invention is the provision of an improved compass or guidance device using Hall generators in combination with inexpensive and reliable solid state circuitry which is free of elements having a magnetic field or having a notable influence on the earth's field, such as transformers, flux concentrators, moving needle phase meters and other core devices.

Yet another object is to provide a self-contained, portable compass device that can be carried underwater by a diver and which provides a readily discernable indication of whether the diver is heading on a selected course and in which direction to alter his heading in the event he is off course.

Still another object is the provision of a device of the foregoing character that is easy to adjust to select a course or heading to follow, and which is free of possible ambiguity in indication.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
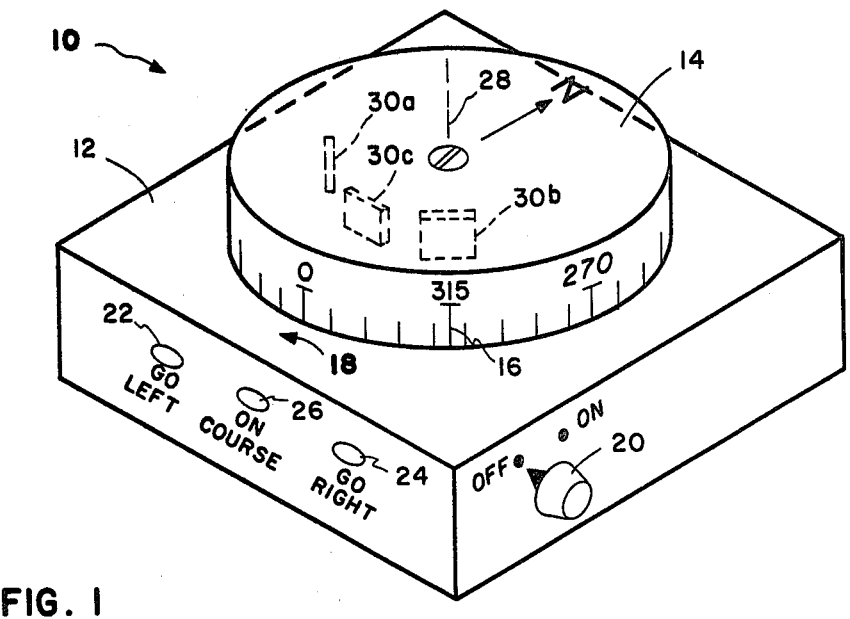
FIG. 1 is a perspective view of a compass device embodying the present invention.

Referring to FIG. 1, a substantially non-magnetic compass embodying the invention is indicated generally at 10 and comprises a base 12 that serves as a housing for various components and supports a rotatable, course or heading selecting dial 14. The dial 14 is circular and presents compass heading graduations 16 around the perimeter thereof. These graduations are cooperable with an index 18 on the base 12 to condition the compass base 12 for use in selecting a course or heading to be followed.

The base 12 further supports an off-on switch 20 and a plurality of indicator lights. In this embodiment there are three such lights in the form of light emitting diodes 22, 24, and 26 representing a need to go left, a need to go right, and the correct heading, respectively. Mounted within the dial 14, for rotational movement therewith relative to the base 12 and about a vertical central axis 28, are three Hall effect generators 30a, 30b, and 30c. These generators are well known solid state devices that comprise a semiconductor wafer or slab that, when energized by a first voltage applied to opposite parallel edges, are characterized by a second voltage at right angles to the first voltage and proportional to the flux density of an externally applied magnetic field as viewed along an axis normal to the plane surfaces of the slab, which axis may be regarded as the principal magnetic axis of the generator.

Figure 3:
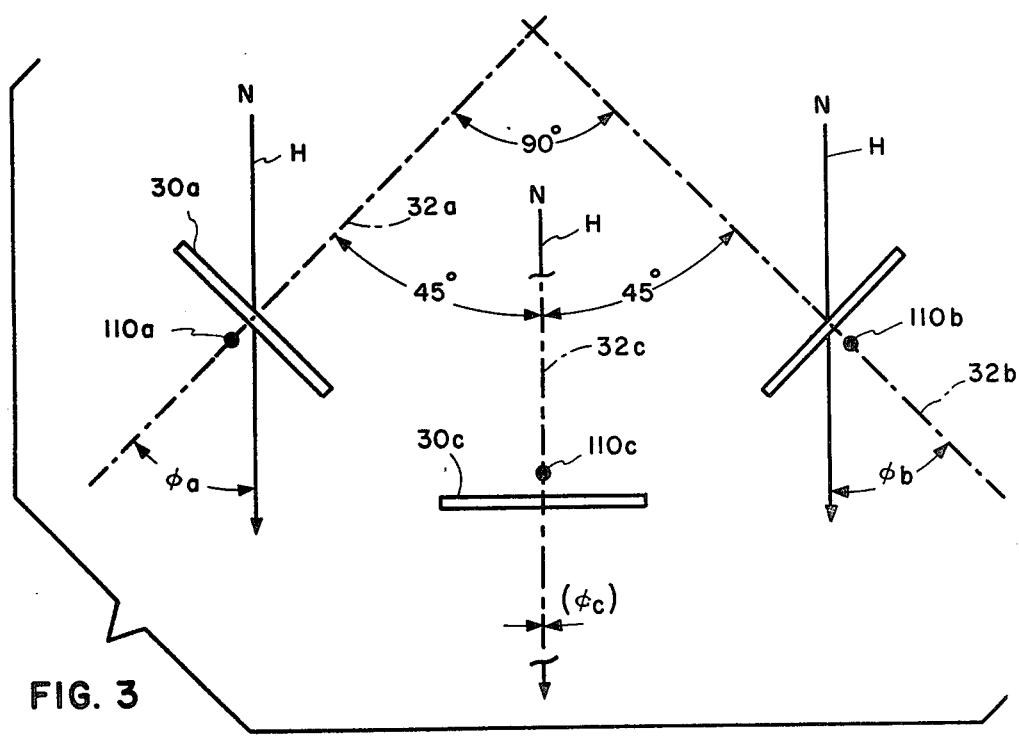
FIG. 3 is a plan view of the Hall effect generators forming part of the circuitry of FIG. 2, illustrating the positional and polarity relationships therebetween.

In accordance with the embodiment 10 of the invention being described, the plane surfaces of the Hall effect generators 30a and 30b are disposed normal to one another, while the generator 30c is disposed with its plane surfaces at 135° angles with each of the plane surfaces of the generators 30a and 30b. Stated in terms of the principal magnetic axes 32a, 32b, and 32c, respectively, and with reference to FIG. 3 illustrating the generators in plan, the axes 32a and 32b are normal to one another, while the axis 32c is disposed at angles of 45° to each of the other axes.

Figure 2:
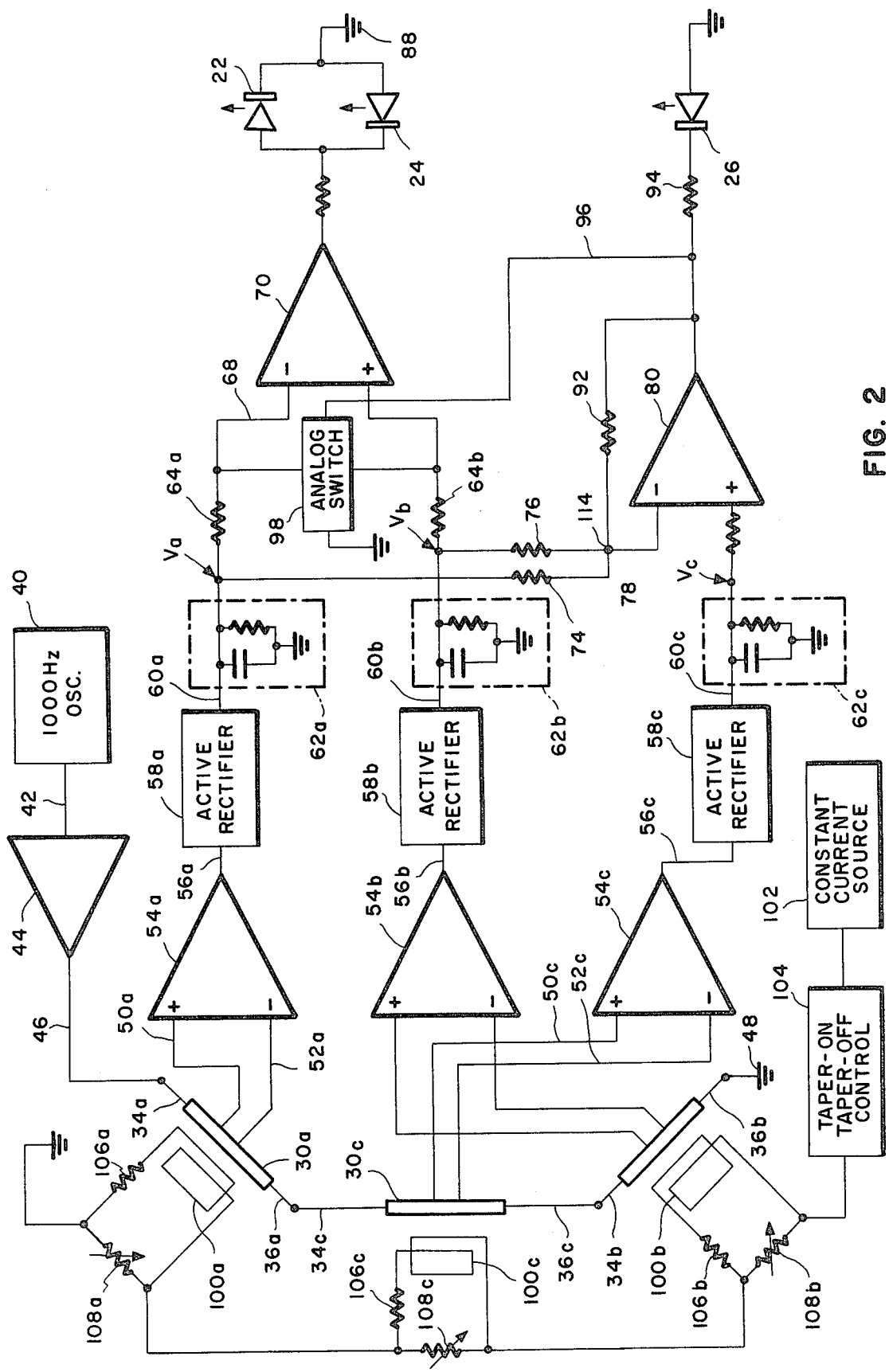
FIG. 2 is a diagrammatic illustration, in block form, of the electronic circuitry of the compass device of FIG. 1.

Referring now to FIG. 2, the generator 30a is provided with a pair of input leads 34a, 36a while the generator 30b is provided with input leads 34b, 36b and generator 30c with input leads 34c, 36c. The generators are adapted to be excited or energized in series with an A.C. voltage of a predetermined frequency provided by an oscillator 40. In this example that frequency is 1000 Hz and is applied, as shown by line 42 to a power amplifier 44 which provides sufficient power via line 46 to the series connected Hall effect generators to effect approximately a 100 milliamp excitation current through those generators to nominal ground 48.

The Hall effect generator 30a is provided with a pair of first and second output leads 50a, 52a, connected to the inputs of a differential amplifier 54a. The output of the amplifier 54a is connected, as shown by line 56a, to an active rectifier 58a, the rectified output of which is fed, via line 60a, a filter 62a, and a resistor 64a, to one input 68 of a differential amplifier 70 serving as a voltage comparator.

Similarly, the Hall effect generator 30b is provided with a pair of first and second output leads 50b, 52b connected to the inputs of a second differential amplifier 54b. The output of the amplifier 54b is connected, as shown by line 56b, to an active rectifier 58b, the rectified output of which is fed, via line 60b, a filter 62b, and a resistor 64b, to the other input 72 of the comparator amplifier 70.

The outputs of the filters 62a, 62b are futher applied, via resistors 74 and 76 respectively, to one input 78 of a differential amplifier 80 connected to serve as an adder/comparator.

The Hall effect generator 30c is likewise provided with a pair of output leads 50c, 52c connected to the inputs of a differential amplifier 54c. The output of the amplifier 54c is connected, as shown by line 56c, to an active rectifier 58c, the rectified output of which is fed, via line 60c, filter 62c, and a resistor 64c, to the other input 82 of the adder/comparator amplifier 80.

The output 84 of the comparator amplifier 70 is connected through a resistor 86 to the anode and cathode terminals, respectively, of oppositely oriented light emitting diodes 24 and 26, the remaining terminals of which are grounded at 88. The output 90 of the adder/comparator amplifier 80 is connected via a feedback resistor 92 to the input 78 thereof, by a resistor 94 to the cathode terminal of light emitting diode 28, and by a conductor 96 to the control terminal of an analog or electronic switch 98. The switch 98, which is connected between the inputs 68 and 72 of the comparator amplifier 70, is rendered conductive in response to a predetermined voltage condition at the output of the comparator 80 so as to extinguish both of the light emitting diodes 24 and 26 under certain conditions later explained in connection with the mode of operation.

The Hall effect generators 30a, 30b, 30c typically exhibit small amounts of residual magnetism that introduce undesirable offsets in the output voltages thereof. These offset voltages are capable of being nullified either electronically by appropriate voltage biasing of the respective amplifiers 54a, 54b, 54c, or by magnetic biasing of the individual generators. Accordingly, the invention contemplates the elective inclusion of magnetic biasing coils 100a, 100b, and 100c associated with the respective generators. These coils are adapted to be energized from a constant D.C. source 102 through a taper-on/taper-off control 104.

The coils 100a, 100b, 100c, which are connected in series with load resistances 106a, 106b, 106c and with one another, are provided with variable shunt resistors 108a, 108b, and 108c, respectively.

The variable shunt resistors permit adjustment of the current in each of the biasing coils 100a, 100b, 100c so as to nullify or offset any residual magnetism, and hence to nullify any offset voltages, that the individual Hall effect generators may have. The coils 100a, 100b, and 100c, which may be connected directly on one plane surface of each generator, are typically of very small diameter, on the order of three-eighths of an inch, and accordingly, when used, provide a magnetic effect that is limited to the near field and can be held within the limits of safety required for use as a substantially nonmagnetic compass. In effecting energization and deenergization of the coils 100a, 100b, and 100c, the taper-on/taper-off control precludes any sudden changes in magnetic field that might result in a larger residual magnetization of the generators.

It will be understood that the connections between the array of Hall effect generators 30a, 30b, and 30c in the rotatable dial 14 and the analog logic circuitry components in the base 12 may be effected either by slip rings or twisted flexible conductors. It will also be understood that the amplifiers and other electronic components are selected to be of substantially non-magnetic materials and are conveniently potted for underwater use in a manner well known to those skilled in the art of underwater electronic devices.

MODE OF OPERATION

With the switch 20 in its on position, various components of the circuit are provided with suitable voltages derived from a power source, such as 102, which may advantageously comprise non-magnetic cells of the gel cell type.

The amplified 1000 Hz output of the oscillator 40 is applied through the series connected Hall effect generators 30a, 30b, and 30c with the result that each of excited, in phase, by a predetermined A.C. voltage across their respective inputs. When the centerline of the base 12 of the compass device 10 is aligned with a selected course, the Hall effect generators 30a, 30b, and 30c being positioned by the dial setting, will be oriented as shown in FIG. 3 with the top of the drawing sheet pointed north.

It should be noted at this point that it is characteristic of Hall effect generators to be polarized in their responses to externally applied magnetic fields. This polarity is indicated in FIG. 3 by dots 110a, 110b, and 110c adjacent the sides of the generators having like polarity. Because of their series connection the three generators are excited in phase by the A.C. input voltage. The A.C. output voltage of each generator, however, is in phase with the input voltage only when that generator has its dot or north side polarity, side facing in northerly directions and exhibits a 180° phase change when the dot side is facing southerly directions. When the generator array is oriented with the top of the sheet bearing FIG. 3 pointed north, the output voltages of the generators 30a, 30b are 180° out of phase with the output voltage of the generator 30c.

Assuming the prior mentioned offset voltages to have been reduced substantially to zero, the output voltages of the generators will be proportional to the cosine of the angles $\phi_a$, $\phi_b$, $\phi_c$ that the principal magnetic axes 32a, 32b, 32c make with the earth's magnetic field. These outputs are applied respectively, as shown in FIG. 2, to the differential amplifiers 54a, 54b, and 54c, are rectified by rectifiers 58a, 58b, and 58c, and filtered by filters 62a, 62b, and 62c to provide analog signals in the form of analog voltages $V_a$, $V_b$, and $V_c$ the magnitudes of which are representative of their respective angles $\phi_a$, $\phi_b$, $\phi_c$ with the earth's field, and the signs of which are representative of whether the respective dot sides are facing in northerly or southerly directons. Thus, when any of the generators 30a, 30b, and 30c is oriented with its principal magnetic axis parallel to the earth's magnetic field and its dot side facing away from magnetic north, the corresponding analog voltage will be a maximum $V_N$ of a first, say positive, sign and will diminish toward zero as the generator is rotated to bring the principal magnetic axis normal to the earth's field. Conversely, when oriented with the dot directly facing north, the analog voltage will be a maximum, $V_S$, that is numerically equal to $V_N$ but of opposite or negative sign and will diminish toward zero as the generator is rotated to bring the principal magnetic axis normal to the earth's field.

For example, assuming $V_N = +100$ mv and $V_S = -100$ mv, with the top of the drawing sheet bearing FIG. 3 pointed north, the analog voltage $V_a$ due to the generator 30a may be expressed as $$V_a = \cos 45° \ V_N, \text{ or } +70.7 \text{ mv},$$

the analog voltage $V_b$ due to generator 30b may be expressed as $$V_b = \cos 45° \ V_N, \text{ or } +70.7 \text{ mv},$$

the analog voltage $V_c$ due to generator 30c may be expressed as $$V_c = V_S, \text{ or } -100 \text{ mv}.$$

Now, if the top of the sheet is rotated to point northwest, the analog voltages would be $$V_a = V_N, \text{ or } +100 \text{ mv},$$

$$V_b = 0, \text{ or zero mv},$$

$$V_c = \cos 45° \ V_S, \text{ or } -70.7 \text{ mv},$$

and with the top of the sheet pointed south the analog voltages would be $$V_a = \cos 45° \ V_S, \text{ or } -70.7 \text{ mv},$$

$$V_b = \cos 45° \ V_S, \text{ or } -70.7 \text{ mv, and}$$

$$V_c = V_N, \text{ or } +100 \text{ mv}.$$

In the first or north pointing example the following conditions obtain $$V_a = V_b \text{ and } V_a + V_b > V_c,$$

in the second or northwest pointing example, $$V_a > V_b \text{ and } V_a + V_b > V_c,$$

in the third or sourth pointing example, $$V_a = V_b \text{ and } V_a + V_b < V_c.$$

The foregoing relationships are exemplary of conditions to which the circuitry of FIG. 2 responds to control lighting and extinguishing of the various light emitting diodes to guide the user of the compass device 10 in following a course or heading.

Consider that a user wished to travel a vectored course of 045°, he will rotate the dial 14 as necessary to place the 045° mark adjacent the index 18. Now, when the centerline of the device 10 is aligned with the desired course, the generators 30a, 30b, and 30c will be positioned relative to north as indicated in the first example above given where $V_a = V_b$ and $V_a + V_b > V_c$. In that situation, the comparator amplifier 70 responds to the equality of the inputs $V_a$ and $V_b$ thereto by providing a substantially zero voltage output 84 and hence zero current flow through either of the light emitting diodes 22 and 24, which are therefore not lighted. Simultaneously, the voltages $V_a$ and $V_b$ are summed at point 114 and the result compared to $V_c$ by amplifier 80. Also, in the situation being considered, $V_a + V_b > V_c$ and the resulting output potential of the amplifier 80 is such that the light emitting diode 28 is forward biased, whereby current flows and the diode is lighted to indicate that the user is on course (on the proper heading).

Now, if the user get off the proper heading, say to the left thereof, a situation similar to the second example exists. That is, $V_a > V_b$ and $V_a + V_b > V_c$. In that situation the amplifier 70 responds to the difference between $V_a$ and $V_b$ to provide an output potential at line 84 that results in current flow only through the light emitting diode 24 so that it is lighted to indicate to the user that he should turn right in order to get back on the selected heading.

Similarly, if the user assumes a heading to the right of his selected heading, then $V_b > V_a$ and $V_a + V_b > V_c$ and the amplifier 70 responds to the difference between $V_a$ and $V_b$ to provide an output potential at line 84 that results in current flow only through the light emitting diode 26 so that it is lighted to indicate to the user that he should turn left to get back on the selected heading.

Should the user be so far off his heading, for example when assuming a new course, that the Hall effect generator 30c has its dot side facing in southerly directions, then $V_a + V_b < V_c$ and the amplifier 80 will respond by providing a voltage output on line 90 of a sign that is reversed from that when the dot side is facing northerly directions. In this condition, the light emitting diode 28 is reverse biased and the analog switch 98 is rendered conductive so as to equalize the inputs to amplifier 70. Accordingly, all of the diodes are extinguished and will remain so until the user changes heading in either direction sufficiently to reestablish a condition wherein $V_a + V_b > V_c$. At that time the analog switch 98 will open and appropriate one of diodes 24 and 26 will be lighted to guide the user to his selected heading.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A compass device for use in following a selected heading, said device comprising:

an array of first, second, and third Hall effect generators each having a principal axis of magnetic response and a side of predetermined polarity relative to the earth's magnetic field, said first and second generators having their principal axes normal to one another and at 45° to the principal axis of said third generator, and said first and second generators having sides of like predetermined polarity facing northerly directions when said third generator has its side of like polarity facing directly south;

means for energizing said first, second, and third generators with alternating current input voltages so as to provide first, second, and third alternating current output voltages corresponding in amplitude and phase relation to orientation of said array relative to the earth's magnetic field;

means for converting said first, second, and third alternating current voltages to first, second, and third direct current analog voltages wherein the magnitudes of the analog voltages are proportional to the cosines of the angles between the respective principal axes of the generators and the earth's magnetic field, and the signs of the analog voltages are positive or negative as the respective generators have their sides of predetermined polarity facing northerly or southerly directions;

first, second, and third light emitting means corresponding respectively to a condition requiring turning left to attain said heading, and an on course condition;

first comparator means, responsive to said first and second analog voltages, for providing a first direct current output voltage that is of one sign when said first analog voltage is greater than said second analog voltage and is of opposite sign when said second analog voltage is greater than said first analog voltage;

said first light emitting means being lighted in response to said first direct current output voltage when of said first sign and said second light emitting means being lighted in response to said first direct current output voltage when of said opposite sign;

second comparator means, responsive to said first, second and third analog voltages to provide a second direct current output voltage that is of a first sign when the sum of said first and second analog voltages is greater than said third analog voltage and is of opposite sign when said sum is less than said third analog voltage; and said third light emitting means being lighted in response to said second direct current output voltage when of said first sign.

2. A compass device as defined in claim 1, and further comprising:

base means supporting said first, second, and third light emitting means for viewing by a user;

indicia means on said base;

said array being mounted on said base for rotation relative to said indicia means for selection of said heading.

3. A compass device as defined in claim 1, and further comprising:

switch means, responsive to said second direct current output voltage when of said second sign, for rendering said first operational amplifier means non-responsive to said first and second analog voltages whereby both of said first and second light emitting means are extinguished irrespective of whether either of said first and second analog voltages is greater.

4. A compass device as defined in claim 3, and further comprising:

base means supporting said first, second, and third light emitting means for viewing by a user;

indicia means on said base;

said array being mounted on said base for rotation relative to said indicia means for selection of said heading.

5. A compass device as defined in claim 3, and further comprising:

means for substantially nullifying any offset voltages to said first, second, and third alternating current output voltages.

6. A compass device as defined in claim 5, and wherein:

said means for converting said first, second, and third alternating current output voltages to said first, second, and third direct current analog voltages comprises first, second, and third differential amplifiers, first, second, and third rectifier means and first, second, and third filter means respectively.

7. A compass device as defined in claim 6, and wherein:

said first, second, and third light emitting means comprises first, second, and third light emitting diodes.

8. A compass device as defined in claim 7, and wherein:

said means for substantially nullifying said offset voltages comprises first, second, and third biasing coils associated with said first, second, and third Hall effect generators.

9. A compass device as defined in claim 8, and wherein:

said first and second comparator means comprise operational amplifiers.

10. A substantially nonmagnetic compass device for underwater use in following a predetermined heading, said device comprising:

a base;

a dial mounted on said base for rotation about a vertical axis;

said dial and base having cooperating indicia for selecting said predetermined heading;

an array of first, second, and third Hall effect generators carried by said dial for rotational movement therewith relative to said base, said generators being disposed with their principal magnetic axis substantially horizontal, the principal magnetic axis of said first and second generators being disposed in planes normal to one another and at 45° angles to the principal axis of said third generator, said first and second generators being characterized by sides of one polarity facing in northerly directions when said third generator has its side of said one polarity facing directly south;

first, second, and third light emitting diodes mounted on said base and individually energizeable to indicate go to right, go to left, and on course conditions, respectively;

oscillator and amplifiers means for providing an alternating current input to said Hall effect generators, said generators being connected to receive said alternating current input in series with one another;

first, second, and third differential amplifiers having their input connections connected across the output connections of said first, second, and third Hall effect generators, respectively, so as to provide first, second, and third alternating current output voltages which vary in amplitude with the cosines of the angles of the respective principal axes with the earth's magnetic field, and which are of one phase when said sides of one polarity are facing in northerly directions and of opposite phase when facing in southerly directions;

first, second, and third rectifier means, responsive to said first, second, and third alternating current output voltages to provide first, second, and third analog voltages $V_a$, $V_b$, and $V_c$, respectively; and logic means, responsive to said analog voltages to energize said first light emitting diode only when $V_a > V_b$ and $V_a + V_b > V_c$, to energize said second light emitting diode only when $V_b > V_a$ and $V_a + V_b > V_c$, and to energize said third light emitting diode only when $V_a = V_b$ and $V_a + V_b > V_c$.

11. A compass device as defined in claim 10, and further comprising:

first, second, and third biasing coils mounted adjacent said first, second, and third Hall effect generators, said coils being connected in series with one another;

a direct current power source;

control means for connecting said direct current power source to said coils; and first, second, and third variable shunt resistors connected in parallel with said first, second, and third coils respectively, whereby current flow in each of said coils can be adjusted.

* * * * *